United States Patent
Brown et al.

(10) Patent No.: US 8,561,657 B2
(45) Date of Patent: Oct. 22, 2013

(54) MARINE FUEL TANK ULLAGE SYSTEM

(75) Inventors: Christopher Brown, Merritt Island, FL (US); Marvin Peplow, Bartlett, IL (US)

(73) Assignee: Bluskies International, LLC, Bartlett, IL (US)

( * ) Notice: Subject to any disclaimer, the term of this patent is extended or adjusted under 35 U.S.C. 154(b) by 394 days.

(21) Appl. No.: 12/900,713

(22) Filed: Oct. 8, 2010

(65) Prior Publication Data

US 2011/0308662 A1   Dec. 22, 2011

Related U.S. Application Data

(60) Provisional application No. 61/250,376, filed on Oct. 9, 2009.

(51) Int. Cl.
*B65B 3/04* (2006.01)

(52) U.S. Cl.
USPC ............ 141/303; 141/198; 137/202; 137/587

(58) Field of Classification Search
USPC ......... 137/583, 587, 197, 202, 213, 391, 588; 141/198, 303, 308, 309
See application file for complete search history.

(56) References Cited

U.S. PATENT DOCUMENTS

| | | | | |
|---|---|---|---|---|
| 5,014,742 A | * | 5/1991 | Covert et al. | 137/588 |
| 5,375,633 A | * | 12/1994 | Bucci | 141/59 |
| 5,386,843 A | * | 2/1995 | Church | 137/202 |
| 5,669,361 A | * | 9/1997 | Weissinger et al. | 123/520 |
| 6,016,827 A | * | 1/2000 | Dawson | 137/202 |
| 6,302,137 B1 | * | 10/2001 | Devall | 137/202 |
| 7,225,826 B2 | * | 6/2007 | Riviezzo | 137/202 |

* cited by examiner

*Primary Examiner* — Stephen M Hepperle
*Assistant Examiner* — Daniel Edelbrock
(74) *Attorney, Agent, or Firm* — Clifford Kraft

(57) ABSTRACT

A ullage system for a marine fuel tank that maintains an exact ullage space in all marine refueling situations including refueling in moving or pitching and rolling situations. The invention includes two ball valve assemblies that are inserted into a fuel tank at approximately the same level. The two assemblies typically are at opposite ends of the tank. One of the ball valves is smaller than the other in diameter. The smaller valve is coupled to an air vent; the larger valve is coupled to the filler tube. An important feature of the present invention is that it can typically be made to fit any marine fuel tank simply by changing the length of a vent tube to reach the correct ullage level for the tank at hand. The components of the present invention can be made from standard fuel valve materials.

15 Claims, 3 Drawing Sheets

MARINE FUEL TANK ULLAGE SYSTEM

This application relates to and claims priority from U. S. Provisional Patent Application No. 61/250,376 filed Oct. 9, 2009. Application 61/250,376 is hereby incorporated by reference.

BACKGROUND

1. Field of the Invention

The present invention relates generally to marine fuel tanks and more particularly to a marine fuel tank ullage system.

2. Description of the Problem

Fuel tanks in marine vessels, like automotive fuel tanks, are required to maintain a minimum fuel vapor expansion space or ullage of no less than 5%. Unlike automotive fuel tanks however, marine vessels are often refueled in moving or dynamic situations as opposed to the static refueling of a motor vehicle at a land-based fuel station. It would be advantageous to have a marine fuel tank ullage system that accommodates all types of marine fueling that maintains an exact ullage space in all situations.

SUMMARY OF THE INVENTION

The present invention relates to a ullage system for a marine fuel tank that maintains an exact ullage space in all marine refueling situations including refueling in moving or pitching and rolling situations. The invention includes two ball valve assemblies that are inserted into a fuel tank at approximately the same level. The two assemblies typically are at opposite ends of the tank. One of the ball valves is smaller than the other in diameter. The smaller valve is coupled to an air vent; the larger valve is coupled to the filler tube. An important feature of the present invention is that it can typically be made to fit any marine fuel tank simply by changing the length of a vent tube to reach the correct ullage level for the tank at hand. The components of the present invention can be made from standard fuel valve materials.

DESCRIPTION OF THE FIGURES

Attention is directed at several illustrations that show features of the present invention.

Several drawings and illustrations have been presented to aid in understanding the features of the present invention. The scope of the present invention is not limited to what is shown in the figures.

DESCRIPTION OF THE INVENTION

The present invention relates to a ullage system for a marine fuel tank that maintains an exact ullage space in all marine refueling situations including refueling in moving or pitching and rolling situations.

Figure 1:
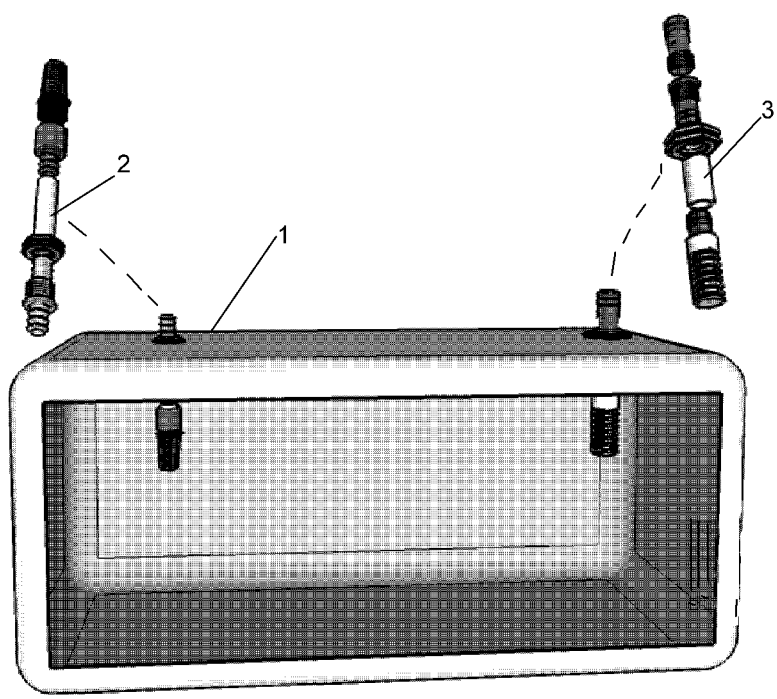
FIG. 1 shows a section of a marine fuel tank with an embodiment of the present invention.

Turning to FIG. 1, a section of a marine fuel 1 tank is shown. A first 2 and second 3 ball valve is mounted on the tank as shown. The first ball valve 2 is generally smaller than the second ball valve 3. The two independent ball valves 2, 3 are mounted in the vapor space region inside the marine fuel tank. The valve seats are set at the same level which is the required ullage level. The smaller ball valve 2 can be connected to a ⅝ inch (or other size) vent tube which sits above the ball valve. The large ball valve 3 can be around 1 ½ inch (or other size) and can be directly connected to a filler tube.

As the fuel tank is filled through the filler tube, vapors escape freely through the smaller ⅝ inch vent tube above the smaller ball valve 2. Additionally, some vapors escape around the 1 ½ inch ball valve 3 of the filler tube. Upon reaching the ullage level, both ball valves are forced against their seats simultaneously, and a small amount of pressure begins to build up. In this state, the smaller valve is forced shut as the larger valve vacillates under the combined agitation of the fuel and the building back pressure. The larger valve than closes completely, and the incoming fuel is forced up the filler neck to the nozzle and shut-off mechanism. Upon completion of this event, the remaining fuel in the filler tube seeps past the larger ball valve, and the fuel level settles at or around the valve seat heights.

Because of the two valves working in tandem, the ullage level remains at or around the valve seat height regardless of vessel rocking and rolling motion during in-water fueling events. Additional benefits can include fuel vapor vent overflow protection and spit back reduction at the filler neck.

Figure 2:
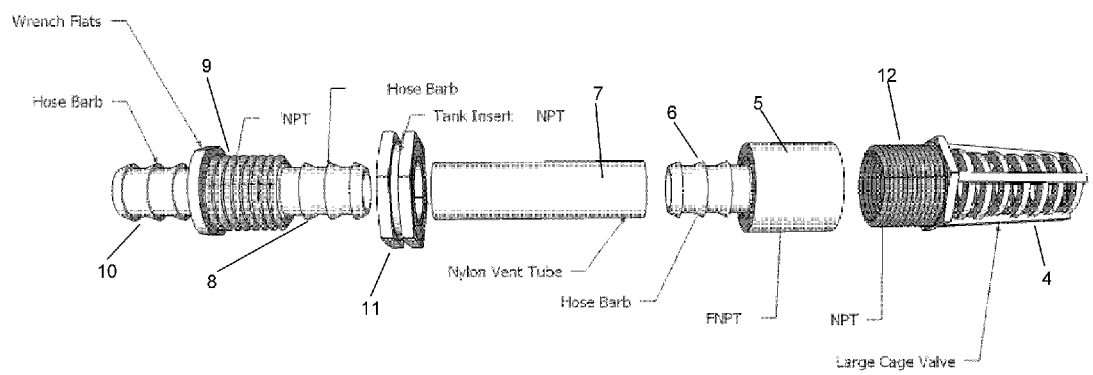
FIG. 2 shows details of one of the ball valves that can be used with the present invention.

FIG. 2 shows a typical ball valve that can be used in the present invention. The actual ball valve is in a threaded 12 cage 4 that can be connected to hub 5 with a hose barb 6. A vent tube 7, preferably Nylon (™), can couple to a double hose barb 8 that also has a threaded portion 9 that can be installed to the fuel tank 1. An external hose barb portion 10 of the double barb 8 can be connected to a filler tube or a vent depending on whether the valve shown in FIG. 2 is the first or smaller ball valve 2 or the second larger ball valve 3 of FIG. 1. A tank insert 11 allows the double hose barb 8 to be connected with the vent tube 7.

An important feature of the present invention is that it can be made to fit any marine fuel tank simply by changing the length of the vent tube 7 (or other components) to reach the correct ullage level for the tank at hand. The components of the present invention can be made from standard fuel valve materials. Any material is within the scope of the present invention as long as it can be used in a fuel situation.

Figure 3:
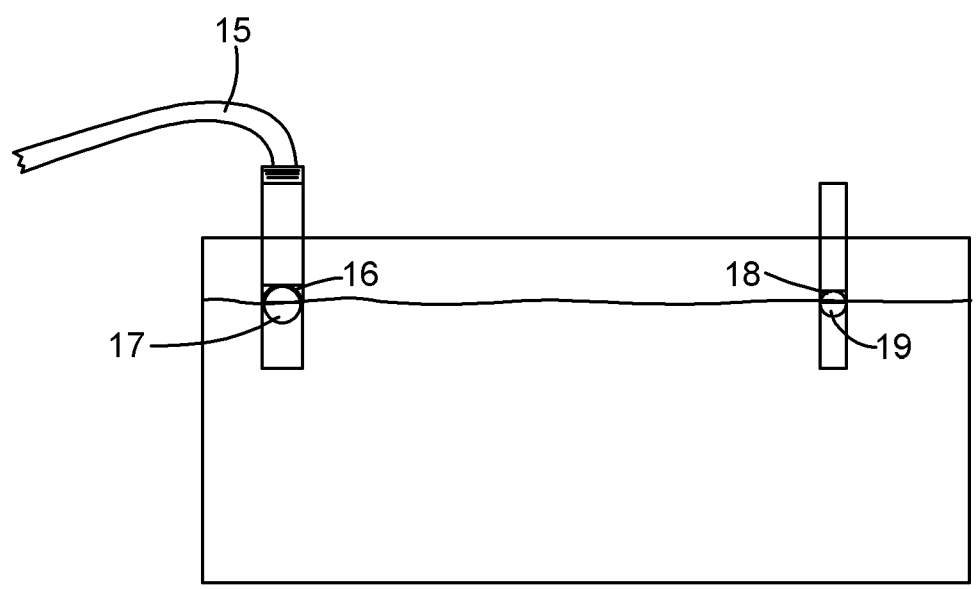
FIG. 3 shows a side schematic view of a tank with two ball valves with different diameter tubes.

FIG. 3 shows a side schematic view of a tank with two ball valves, each with a different tube diameter. The first ball 17 and second ball 19 can be clearly seen as can the first seat 16 and the second seat 18. The two seats 16 and 18 are at approximately the same vertical height. A filler hose 15 can also be seen.

Several descriptions and illustrations have been presented to aid in understanding features of the present invention. A person with skill in the art will realize that numerous changes and variations can be made without departing from the spirit of the invention. Each of these changes and variations is within the scope of the present invention.

We claim:

1. A ullage system for a marine fuel tank comprising;
   first and second ball valve assemblies each including a ball and seat in first and second tubes respectively, the first ball valve assembly having a tube diameter smaller then that of the second ball valve assembly;
   said first and second ball valve assembles mounted apart on a marine fuel tank top with first and second tubes penetrating the tank top and first and second balls and seats located inside the tank, said first and second seats mounted at equal vertical positions in the tank at a desired ullage level for said tank;
   the first tube being open to the atmosphere above the tank, and the second tube being attachable to a filler hose.

2. The ullage system of claim 1 wherein said first tube connects to a ⅝ inch vent tube.

3. The ullage system of claim 1 wherein said second tube connects to a 1 ½ inch filler tube.

4. The ullage system of claim 1 further including a double-barbed section attached to each tube.

5. A method of maintaining ullage in a marine fuel tank comprising:
   placing a first ball valve with a first valve seat and first ball diameter at a first end of a marine fuel tank, said first ball valve having a first stem penetrating said fuel tank;
   placing a second ball valve with a second valve seat and second ball diameter at an opposite end of said marine fuel tank, said second ball valve having a second stem also penetrating said fuel tank such that second valve seat is at approximately the same vertical location as the first valve seat, and wherein said second ball diameter is smaller than said first ball diameter
   allowing said first stem to operate as a filler tube;
   allowing said second stem to operate as an air vent.

6. The method of claim 5 wherein said first and second ball valves have a lower caged section.

7. The method of claim 5 wherein at least one of said stems is Nylon (™).

8. The method of claim 5 wherein each of said stems attaches to a double-barbed member.

9. The method of claim 5 wherein said second stem is approximately ⅝ inch in diameter.

10. The method of claim 5 wherein said first stem is approximately 1 ½ inch in diameter.

11. A method of controlling ullage in a marine fuel tank during filling comprising:
    cutting two holes in a top surface of a marine fuel tank;
    inserting a first ball valve assembly into a first of said holes, said first ball valve assembly including a first stem and a first ball in communication with a first seat in a caged section at a lower end of said first ball valve assembly;
    inserting a second ball valve assembly into a second of said holes, said second ball valve assembly including a second stem and a second ball in communication with a second seat in a caged section at a lower end of said second ball valve assembly, wherein said second seat is located vertically at approximately a same height as said first seat, and said second ball is smaller in diameter than said first ball.

12. The method of claim 11 wherein said first stem has a diameter of approximately 1 ½ inch.

13. The method of claim 11 wherein said second stem has a diameter of approximately of ⅝ inch.

14. The method of claim 11 wherein at least one of said first or second stems is Nylon (™).

15. The method of claim 11 wherein each of said stems attaches to a double-barbed member.

* * * * *